(12) United States Patent
Wakabayashi et al.

(10) Patent No.: US 9,321,400 B2
(45) Date of Patent: Apr. 26, 2016

(54) DRIVE ASSIST DEVICE

(75) Inventors: Haruki Wakabayashi, Anjo (JP); Kenji Miura, Chiryu (JP); Kinji Yamamoto, Anjo (JP); Noboru Nagamine, Anjo (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 398 days.

(21) Appl. No.: 13/699,181

(22) PCT Filed: May 23, 2011

(86) PCT No.: PCT/JP2011/061751
§ 371 (c)(1),
(2), (4) Date: Nov. 20, 2012

(87) PCT Pub. No.: WO2011/158609
PCT Pub. Date: Dec. 22, 2011

(65) Prior Publication Data
US 2013/0063601 A1    Mar. 14, 2013

(30) Foreign Application Priority Data
Jun. 15, 2010   (JP) .................................. 2010-136290

(51) Int. Cl.
*B60R 1/00* (2006.01)

(52) U.S. Cl.
CPC ............. *B60R 1/00* (2013.01); *B60R 2300/303* (2013.01); *B60R 2300/305* (2013.01); *B60R 2300/607* (2013.01); *B60R 2300/806* (2013.01)

(58) Field of Classification Search
CPC ..................... B60R 2300/305; B60R 230/607; B60R 2300/806; B60R 2300/60; B60R 2300/80; B60R 2300/8093
See application file for complete search history.

(56) References Cited

U.S. PATENT DOCUMENTS

| | | | |
|---|---|---|---|
| 6,369,701 B1 * | 4/2002 | Yoshida et al. | 340/435 |
| 7,068,289 B2 | 6/2006 | Satoh et al. | |
| 7,236,088 B2 * | 6/2007 | Matsukawa et al. | 340/435 |
| 7,277,123 B1 * | 10/2007 | Okamoto et al. | 348/148 |

(Continued)

FOREIGN PATENT DOCUMENTS

| | | |
|---|---|---|
| JP | 2003-87780 A | 3/2003 |
| JP | 2005-313774 A | 11/2005 |

(Continued)

OTHER PUBLICATIONS

International Preliminary Report on Patentability for International Application No. PCT/JP2011/061751 dated Jan. 24, 2013.

(Continued)

*Primary Examiner* — Brian Yenke
(74) *Attorney, Agent, or Firm* — Sughrue Mion, PLLC (57) ABSTRACT

A drive assist device allows a driver to favorably check space for opening a back door along with an image of a periphery of a vehicle. The drive assist device is configured: to perform a viewpoint conversion that converts an image captured by a vehicle-mounted camera, which image is of a scene in the periphery of the vehicle including at least an area rearward of the vehicle, into an overhead image showing the vehicle from above; to superimpose on the overhead image a graphic image showing a flip-up back door in an open state from the same viewpoint as that of the overhead image; and to allow the superimposed image to be displayed on a monitor device in a vehicle compartment.

11 Claims, 4 Drawing Sheets

(56) References Cited

U.S. PATENT DOCUMENTS

| | | | |
|---|---|---|---|
| 8,830,317 B2* | 9/2014 | Meier | 348/143 |
| 2002/0035425 A1* | 3/2002 | Deguchi | B62D 7/159 |
| | | | 701/41 |
| 2003/0052969 A1* | 3/2003 | Satoh et al. | 348/148 |
| 2006/0164514 A1* | 7/2006 | Muramatsu et al. | 348/207.99 |
| 2006/0274147 A1* | 12/2006 | Chinomi et al. | 348/118 |
| 2007/0027598 A1* | 2/2007 | Mori | B60W 10/06 |
| | | | 701/41 |
| 2008/0129756 A1* | 6/2008 | Iwano | 345/632 |
| 2009/0112389 A1 | 4/2009 | Yamamoto et al. | |
| 2009/0132143 A1* | 5/2009 | Kamiya | B60T 7/12 |
| | | | 701/96 |
| 2009/0160940 A1 | 6/2009 | Imamura | |
| 2010/0019935 A1* | 1/2010 | Kawabata | B60R 1/00 |
| | | | 340/932.2 |
| 2010/0066825 A1* | 3/2010 | Kuboyama | G06K 9/00812 |
| | | | 348/118 |
| 2010/0066833 A1* | 3/2010 | Ohshima et al. | 348/148 |
| 2010/0070139 A1* | 3/2010 | Ohshima et al. | 701/42 |
| 2010/0245577 A1* | 9/2010 | Yamamoto et al. | 348/148 |
| 2013/0002877 A1* | 1/2013 | Miyoshi et al. | 348/148 |
| 2013/0317706 A1* | 11/2013 | Ishibashi et al. | 701/49 |
| 2014/0071279 A1* | 3/2014 | Mokashi et al. | 348/148 |

FOREIGN PATENT DOCUMENTS

| | | |
|---|---|---|
| JP | 2007-91157 A | 4/2007 |
| JP | 2007-237857 A | 9/2007 |
| JP | 2010-69916 A | 4/2010 |
| JP | 2010-123012 A | 6/2010 |
| JP | 2010-260494 A | 11/2010 |
| WO | 2005/080120 A1 | 9/2005 |

OTHER PUBLICATIONS

Extended European Search Report, dated Dec. 18, 2014, issued in corresponding European Patent Application No. 11795517.9.

International Search Report for PCT/JP2011/061751 dated Aug. 9, 2011.

Japanese Office Action issued in Japanese Application No. 2012-520346 dated Oct. 17, 2013.

* cited by examiner

DRIVE ASSIST DEVICE

CROSS REFERENCE TO RELATED APPLICATIONS

This application is a National Stage of International Application No. PCT/JP2011/061751 filed May 23, 2011, claiming priority based on Japanese Patent Application No. 2010-136290 filed Jun. 15, 2010, the contents of all of which are incorporated herein by reference in their entirety.

TECHNICAL FIELD

The present invention relates to a drive assist device for a vehicle that has a flip-up back door in a rear portion.

BACKGROUND ART

Known examples of a drive assist device include a parking assist device that assists the parking of a vehicle with use of images of the periphery of the vehicle captured by a vehicle-mounted camera, and a vehicle periphery monitoring device that alerts the driver upon detecting obstacles or the like in the periphery of the vehicle. JP 2007-237857A (Patent Document 1) discloses a parking assistance device that has a function of determining whether it is possible to secure sufficient space to open a swinging driver's seat door, passenger seat door, back door (rear gate), or the like when parking. A vehicle equipped with the parking assistance device has radar (front sensor and rear sensor) for detecting an object in the periphery of the vehicle and measuring the distance to the object. The space necessary for opening a door (opening space) or distance from the object necessary for opening a door (opening distance) is then calculated, and the result is displayed as a guidance image. In particular, a warning image is displayed if opening is not possible (e.g., paragraphs 26 to 32, 48 to 52, 61 to 66, and 70 to 72, and FIGS. 7, 8, and 10). Also, JP 2005-313774A (Patent Document 2) discloses a rearview device with which a cross-shaped display indicating a vehicle rearward distance from the outermost edge portion of a back door (tailgate) during opening and closing to the rear end portion of the vehicle is superimposed on an image obtained by capturing images of the area rearward of the vehicle (e.g., paragraphs 21 and 25 and FIGS. 3 and 4).

CITATION LIST

Patent Literature

Patent Document 1: JP 2007-237857A
Patent Document 2: JP 2005-313774A

SUMMARY OF INVENTION

Technical Problem

In Patent Document 1, an illustrative guidance image is displayed adjacent to camera video as shown in FIGS. 7, 8, and 10 of this patent document. For example, in the case of the back door (rear gate), a warning image is displayed as illustrative guidance along with the messages "rear gate open limit" and "rear gate cannot be opened". However, there is room for improvement in intelligibility since the images captured by the camera and the warning image are displayed separately. Also, it cannot be said to be easy for a user, such as the driver, to grasp the sense of opening the back door. With Patent Document 2, as shown in FIGS. 3 and 4 thereof, the display that is superimposed on the images captured by the camera is a display that corresponds to a position where a person who performs the operation for opening the back door stands on the road. Accordingly, it cannot be said to be easy to three-dimensionally visualize opening and closing, and there is room for improvement in intelligibility after all.

In view of the above-described background art, there is demand for the provision of a drive assist device that allows the driver to favorably check space for opening the back door along with an image of the periphery of the vehicle.

Solution to Problem

A drive assist device according to the present invention achieved in light of the above-described issues is for a vehicle that has a flip-up back door in a rear portion, and a characteristic configuration is that the drive assist device includes:

a captured image acquisition unit that acquires a captured image obtained by a vehicle-mounted camera capturing an image of a scene in a periphery of the vehicle that includes at least an area rearward of the vehicle;

a viewpoint conversion unit that converts the captured image into an overhead image showing the vehicle from above;

a graphic image generation unit that generates a graphic image expressing the shape of the back door, in which the back door is shown in an open state from the same viewpoint as that of the overhead image; and a display control unit that displays the overhead image on a monitor device in a vehicle compartment with the graphic image superimposed thereon.

According to this characteristic configuration, a graphic image showing the shape of the back door in the open state is superimposed on an overhead image showing the vehicle from above, and therefore the driver can easily check whether there is space for opening the back door. The graphic image and the overhead image obtained by performing viewpoint conversion based on a captured image from a vehicle-mounted camera are not displayed separately, but rather are displayed superimposed with each other, thus obtaining favorable intelligibility. Also, using the overhead image makes it easy for the driver to three-dimensionally visualize the opening and closing of the back door. In this way, according to this characteristic configuration, a drive assist device that allows the driver to favorably check space for opening the back door along with an image of the periphery of the vehicle is provided.

Here, it is preferable that the graphic image is an exterior image of the back door. If the graphic image is an exterior image of the back door, an open back door is naturally added to the vehicle in the overhead image. Note that the exterior image may be an illustration image that illustratively or photo-realistically expresses the exterior of the back door, or may be a photograph image or video image obtained by actually capturing images of the exterior of the back door. If an exterior image is used, the screen design is good, and the driver can be allowed to check space for opening the back door with high intelligibility.

Also, it is preferable that the graphic image is a contour line of the back door. If the graphic image is a contour line of the back door, the graphic image can be generated with a low calculation load and low storage amount, and that graphic image can be superimposed on the overhead image. Also, since it is possible to understand that the superimposed graphic image is clearly different from the actual back door, it is possible to favorably show that the graphic image is displayed as a guide, not showing that the back door is actually open. Also, if the graphic image is a contour line, a region that becomes a blind spot due to the open back door when viewed from the viewpoint of the overhead image is not likely to appear. This enables informing the driver of space for opening the back door without hindering the periphery monitoring function.

Also, it is preferable that the graphic image is semi-transparent. If the graphic image is transparent or semi-transparent, a region that becomes a blind spot due to the shadow of the open back door from the viewpoint of the overhead image is also displayed so as to be visible through the graphic image. For example, even if some kind of object is present on the road surface, the intelligibility of the object is not likely to be hindered by the graphic image. This enables informing the driver of space for opening the back door without hindering the periphery monitoring function. Also, since it is possible to easily understand that the superimposed graphic image is different from the actual back door, it is possible to favorably show that the graphic image is displayed as a guide, not showing that the back door is actually open.

Also, it is preferable that the graphic image is generated as an image in which the back door in the open state has a greater range than in the overhead image. Displaying the graphic image showing the back door in the open state larger than its actual size enables the driver to drive easily. For example, even if the driver attempts to park while leaving the minimum amount of space in which the back door can be opened based on the graphic image, a small amount of extra space will be set. Accordingly, the possibility of coming into contact with another object when opening the back door is also reduced.

Also, it is preferable that the display control unit of the drive assist device according to the present invention superimposes the graphic image on the overhead image in a case where a predetermined display condition is satisfied. If the graphic image showing the back door in the open state is always displayed superimposed on the overhead image, a sense of being bothered can arise depending on the user of the drive assist device (driver). In the case of a configuration in which the graphic image is superimposed when a predetermined display condition is satisfied, usability is secured, and the user is not caused to feel bothered, and thus such a configuration is preferable.

Also, it is preferable that the display control unit of the drive assist device according to the present invention determines that the display condition is satisfied in a case where a passenger of the vehicle performed an operation on an instruction input unit that instructs superimposition of the graphic image on the overhead image. Since the graphic image is superimposed based on an instruction given by a passenger of the vehicle, the graphic image can be appropriately displayed when the user of the drive assist device (passenger such as the driver) thinks the graphic image is necessary. Accordingly, the user is not caused to feel bothered, and usability can be secured. Note that "passenger" refers to a person who can perform an operation on the instruction input unit for instructing superimposition on the overhead image, including the driver. For example, this also includes the case where a person sitting in the passenger seat operates the instruction input unit in accordance with a request made by the driver.

Also, it is preferable that the drive assist device according to the present invention further includes a parking state determination unit that makes a determination regarding a parking state that indicates a state of progress when the vehicle is parked, wherein the display control unit determines whether the display condition is satisfied in accordance with the parking state. Whether or not there is space in which the back door can be opened is important at the final parking position. Accordingly, it is preferable that the graphic image showing the back door in the open state is displayed superimposed according to the parking state of the vehicle. According to this configuration, a parking state determination unit is provided, the parking state is determined, and the graphic image is displayed superimposed based on the determination result, and therefore the graphic image is displayed superimposed in an appropriate period, and good usability is secured.

Also, it is preferable that the display control unit of the drive assist device according to the present invention determines that the display condition is satisfied in a case where a moving speed of the vehicle is less than or equal to a predetermined upper limit speed. If the vehicle is moving faster than the upper limit speed, it is preferable for the driver to direct attention to the actual situation in the periphery of the vehicle, for example, rather than to space for opening the back door or the like. According to this configuration, the display condition is satisfied if the moving speed of the vehicle is less than or equal to the upper limit speed, thus enabling improving usability while maintaining safety. Note that "less than or equal to the upper limit speed", "less than the upper limit speed", and other conditions regarding a boundary with a reference value can be set appropriately.

Also, it is preferable that the display control unit superimposes the graphic image such that the back door is open from a vehicle image that shows the vehicle from the same viewpoint as that of the overhead image. Displaying the graphic image in this way makes it possible to easily visualize the state in which the back door is open.

Also, it is preferable that the overhead image is an image looking down from above the vehicle in a vertical direction. With this configuration, the state in which the back door is fully opened can be visually recognized at a glance. Accordingly, the driver can more favorably check space for opening the back door along with the image of the periphery of the vehicle.

DESCRIPTION OF EMBODIMENTS

Figure 1:
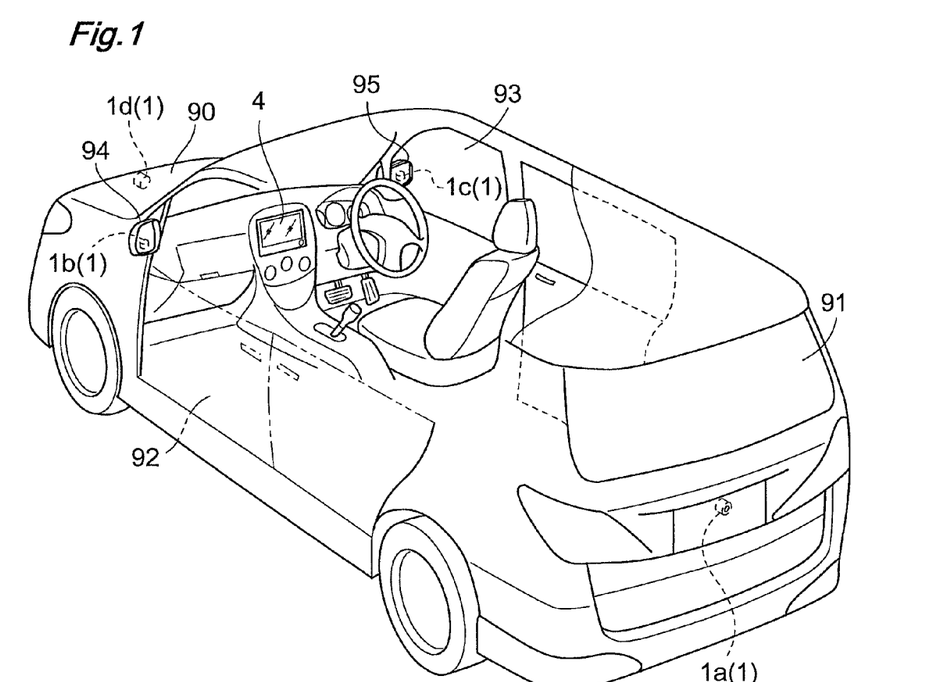
FIG. 1 is a perspective view of a vehicle, with a portion of the vehicle being cut away.

Hereinafter, an embodiment of the present invention will be described with reference to the drawings. The present embodiment is described taking the example of a drive assist device (parking assist device or periphery monitoring device) that generates an overhead image in a mode showing a vehicle from above based on captured images from multiple cameras with which the vehicle is provided, and displays the overhead image on a monitor device. Using the captured images and overhead image enables providing a driver with assistance for a driving operation for parking the vehicle and assistance for monitoring obstacles and the like in the periphery of the vehicle. The drive assist device therefore also functions as a parking assist device and a periphery monitoring device. As shown in FIG. 1, a vehicle 90 includes at least a flip-up back door 91 (hatchback back door 91) whose upper portion is the pivot shaft in the rear portion of the vehicle. The following describes an embodiment of a drive assist device of the present invention using the example where a passenger such as the driver is informed in an overhead image of whether it is possible to secure space in which the back door 91 can be opened when executing parking assistance.

Figure 2:
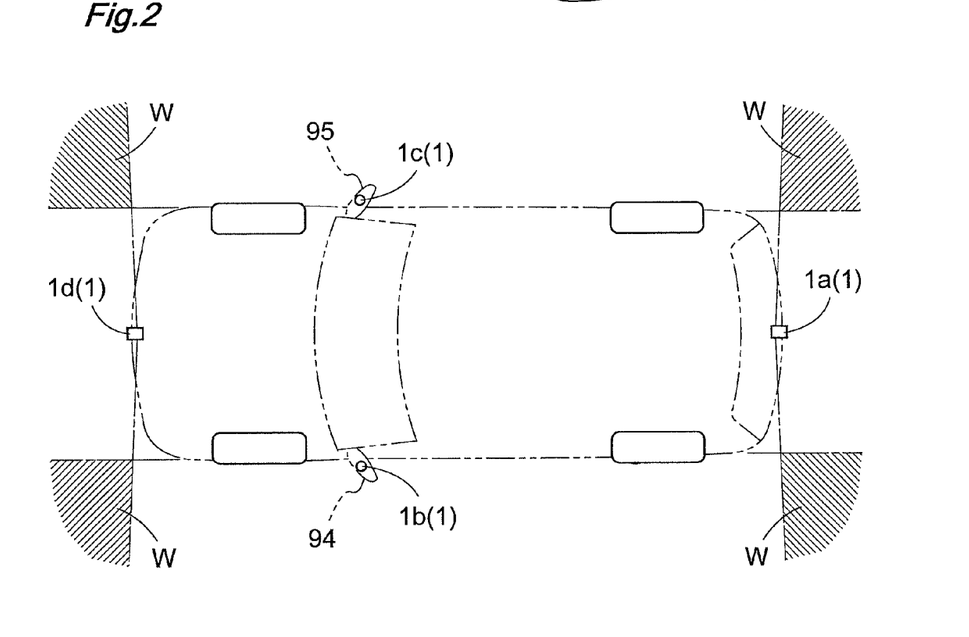
FIG. 2 is a plan view of a capturing range of a camera.

Multiple vehicle-mounted cameras are installed in the vehicle 90. As shown in FIGS. 1 and 2, a rear camera 1a is provided in the rear portion of the vehicle 90, that is to say, on the back door 91. A left-side camera 1b is provided in the lower portion of a left side mirror 94 provided on a left-side front door 92, and a right-side camera 1c is provided in the lower portion of a right side mirror 95 provided on a right-side front door 93. Also, a front camera 1d is provided in the front portion of the vehicle 90. In the following description, the cameras 1a to 1d are collectively referred to as the cameras 1 (vehicle-mounted cameras) when appropriate.

Each camera 1 is a digital camera that captures 15 to 30 frames of two-dimensional images per second in a time series using an imaging sensor such as a CCD (charge coupled device) or a CIS (CMOS image sensor), subjects the images to digital conversion, and outputs video data (captured images) in real-time. Each camera 1 is constituted including a wide-angle lens. In particular, a field of view that is 140 to 190° in the horizontal direction is secured in the present embodiment. The rear camera 1a and the front camera 1d are installed in the vehicle 90 so as to have an angle of depression of approximately 30 degrees relative to the optical axis, and can capture images of a region up to approximately eight meters from the vehicle 90. The left-side camera 1b and the right-side camera 1c are installed in the bottom portion of the side mirrors 94 and 95 with their optical axes facing downward, and can capture images of the road surface (ground surface) and a portion of the side of the vehicle 90.

Figure 3:
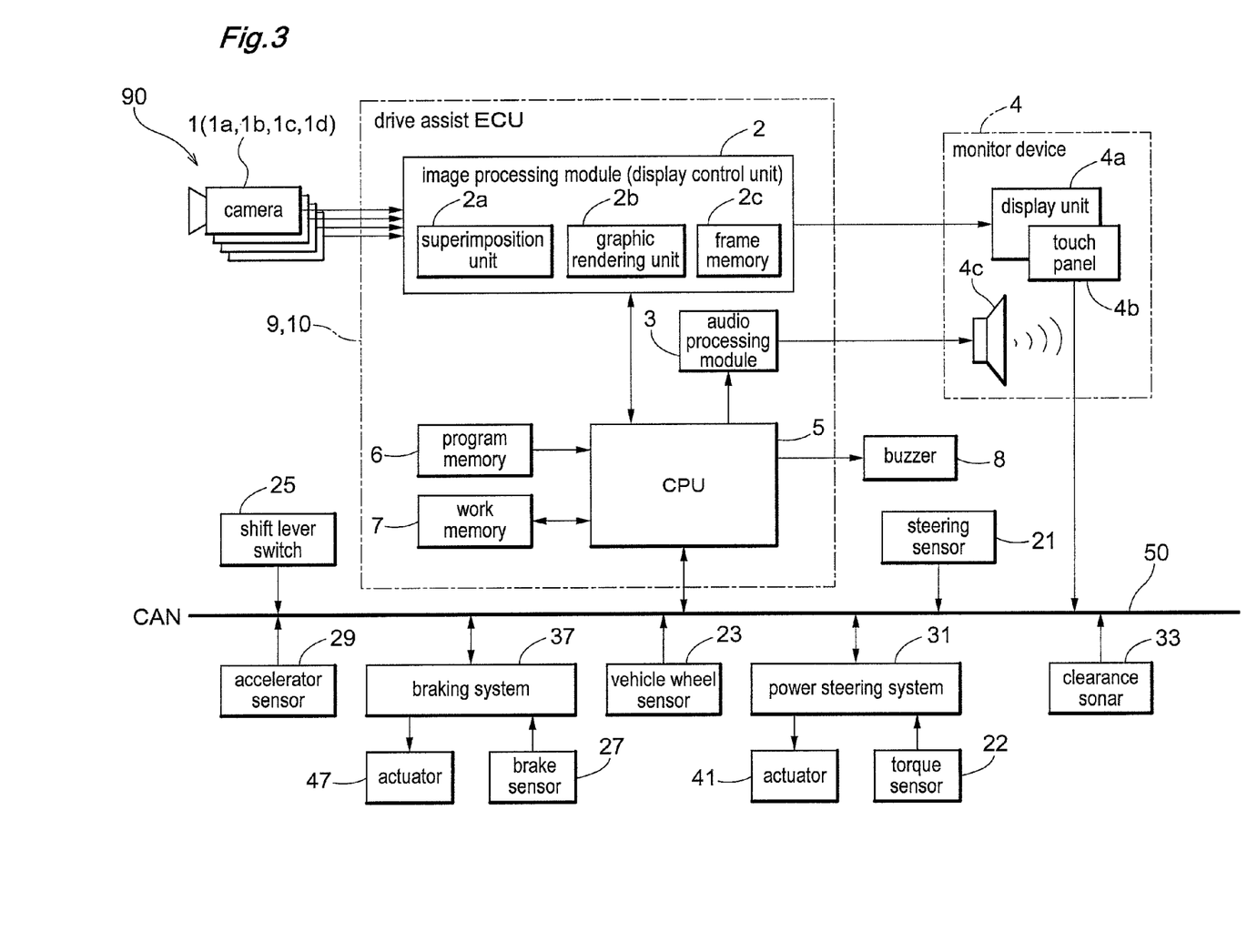
FIG. 3 is a block diagram schematically showing an example of a system configuration of the vehicle.

Images captured by the cameras 1 can be displayed on a monitor device 4 via an image processing module 2 that has a superimposition unit 2a, a graphic rendering unit 2b, a frame memory 2c, and the like as shown in FIG. 3. The two-dimensional images of the respective frames are stored in the frame memory 2c and can be subjected to image processing and graphic superimposition on a frame-by-frame basis. Also, the image processing module 2 can generate a composite image having a wider field of view by compositing together captured images that were captured by multiple cameras 1, and can generate an overhead image by converting the viewpoint of the captured images or the composite image.

An overlap region W (see FIG. 2) is formed in captured images from two cameras at outward positions in corner portions at front and back positions of the vehicle 90, and when a composite image is generated, the captured images are subjected to image processing for obscuring boundary sites in the overlap region W. Also, an overhead image is generated by converting the viewpoint of the composite image and superimposing an exterior image (graphic image) of the roof of the vehicle 90 onto the image after viewpoint conversion. This graphic image may be an illustration image that illustratively or photo-realistically expresses the exterior of the roof of the vehicle 90, or may be a photograph image or video image obtained by actually capturing (capturing and storing in advance) images of the exterior of the roof of the vehicle 90. Of course, a configuration is possible in which captured images from the cameras 1 are individually subjected to viewpoint conversion, and the viewpoint-converted captured images from the cameras 1 are composited together. Image processing technology related to the compositing of captured images and the viewpoint conversion of images will not be described in detail since it is well-known. A rendering instruction for the graphic rendering unit 2b and a graphic superimposition instruction for the superimposition unit 2a are issued by a later-described CPU (central processing unit) 5.

The monitor device of a navigation system, for example, can also serve as the monitor device 4. As shown in FIG. 3, the monitor device 4 has a display unit 4a, a touch panel 4b formed on the display unit 4a, and a speaker 4c. The display unit 4a displays captured images from the cameras 1, which are provided by the image processing module 2, graphic images, composite images obtained by compositing the captured images and graphic images, and the like. As one example, the display unit 4a is configured by a liquid crystal display. The touch panel 4b is formed together with the display unit 4a, and is a pressure-sensitive or electrostatic instruction input device that can output a position touched by a finger or the like as location data. Although FIG. 3 shows the example of the case where the speaker 4c is provided in the monitor device 4, the speaker 4c may be provided in another location, such as the inside of a door. The speaker 4c outputs audio provided by an audio processing module 3 in accordance with an instruction from the CPU 5. Note that there are also cases where the CPU 5 simply outputs an alert sound via a buzzer 8.

The CPU 5 performs high-level arithmetic processing such as image recognition and course prediction, and serves as the core of the drive assist device 10. The CPU 5 executes various types of arithmetic processing using parameters and programs that are stored in a program memory 6. The CPU 5 also temporarily stores captured images and the like in a work memory 7 and executes arithmetic processing thereon as necessary. Although the example where the program memory 6 and the work memory 7 are memories separate from the CPU 5 is shown here, they may be integrated in the same package with the CPU 5. The drive assist device 10 is configured as a drive assist ECU (electronic control unit) 9 along with the CPU 5, the memories, and the other peripheral circuits. Although the CPU 5 is the core in this example, the drive assist device 10 may be configured such that another arithmetic-logic processor or logic circuit, such as a DSP (digital signal processor), is the core.

The CPU 5 is communicably connected to various systems and sensors via an in-car network denoted by reference sign 50 in FIG. 3. In the present embodiment, a CAN (controller area network) 50 is shown as an example of the in-car network. As shown in FIG. 1, the drive assist device 10 (CPU 5) is connected to a power steering system 31 and a braking system 37 in the vehicle. These systems are configured with an electronic circuit such as a CPU serving as the core similarly to the drive assist device 10, and are configured with an ECU, which is configured along with peripheral circuits, serving as the core similarly to the drive assist ECU 9.

The power steering system 31 is an EPS (electric power steering) system or an SBW (steer-by-wire) system. This system applies assistive torque from an actuator 41 to the steering wheel operated by the driver, as well as performs self-steering by driving the steering wheel or steered wheels with the actuator 41. The braking system 37 is an electronic braking system that has an ABS (anti-lock braking system) that suppresses brake locking, a skid prevention device (ESC: electronic stability control) that suppresses vehicle skidding during cornering, braking assistance for increasing braking force, and the like, or a BBW (brake-by-wire) system. This system can apply braking force to the vehicle 90 via an actuator 47.

FIG. 3 shows a steering sensor 21, a wheel speed sensor 23, a shift lever switch 25, and an accelerator sensor 29 as examples of the various sensors that are connected to the CAN 50. The steering sensor 21 is a sensor that detects the steering amount (rotation angle) of the steering wheel, and is configured using a Hall effect sensor, for example. The drive assist device 10 acquires the steering amount of the steering wheel operated by the driver or the steering amount in self-steering from the steering sensor 21 and executes various types of control.

The wheel speed sensor 23 is a sensor that detects the rotation amount or number of rotations per unit of time of the wheels of the vehicle 90, and is configured using a Hall effect sensor, for example. The drive assist device 10 calculates the movement amount and the like of the vehicle 90 based on information acquired from the wheel speed sensor 23, and executes various types of control. There are also cases where the wheel speed sensor 23 is provided in the braking system 37. The braking system 37 detects brake locking, wheel idling, signs of skidding, and the like from a difference in the rotation of the left and right wheels, and executes various types of control. In the case where the wheel speed sensor 23 is provided in the braking system 37, the drive assist device 10 acquires this information via the braking system 37. A brake sensor 27 is a sensor that detects the operation amount of a brake pedal, and the drive assist device 10 acquires this information via the braking system 37. In the case where the brake pedal is pressed during self-steering, for example, the drive assist device 10 can perform control for interrupting or stopping self-steering in consideration of being in an environment that is unfavorable to self-steering.

The shift lever switch 25 is a sensor or a switch that detects the position of the shift lever, and is configured using a displacement sensor or the like. For example, the drive assist device 10 can start assist control if the shift lever is set to reverse, and can end assist control if the shift lever is changed from reverse to a forward gear.

Also, a torque sensor 22 that detects operation torque applied to the steering wheel can also detect whether the driver is gripping the steering wheel. In the case where the driver firmly grips the steering wheel in order to operate it during self-steering, for example, the drive assist device 10 can perform control for interrupting or stopping the self-steering in consideration of being in an environment that is unfavorable to self-steering. Also, creeping of the vehicle 90 due to engine idling is generally used during self-steering. Accordingly, if the accelerator sensor 29 detects that the driver operated the accelerator, the drive assist device 10 can perform control for interrupting or stopping the self-steering in consideration of being in an environment that is unfavorable to self-steering.

The connection topology of the various systems and sensors shown in FIG. 3 is merely one example, and other configurations and connection topologies may be applied. Also, the sensors may be directly connected to the CAN 50 as described above, or may be connected thereto via various systems.

The drive assist device 10 that functions as a parking assist device is configured with the CPU 5 serving as the core as described above, and carries out various types of computation for parking assistance in cooperation with programs (software) stored in the program memory 6. The following are examples of types of parking assistance.

(1) Simply displaying video of the area rearward of the vehicle on a monitor provided in the vehicle.

(2) Furthermore displaying superimposed guide lines such as vehicle width extension lines and predicted course lines.

(3) Using audio or the like to give guidance when a parking target is set, by instructing a steering direction, a steering amount, and driving operations such as acceleration and stopping.

(4) Furthermore leaving only speed adjustment to the driver, and guiding the vehicle to the parking target with self-steering.

In the case of (3) and (4), a parking target is set, and there are various techniques for setting the parking target. The following are some examples.

(a) Setting a predetermined position from the vehicle as the initial position of the parking target based on the stopped position of the vehicle when parking assistance starts.

(b) Setting a parking target after automatically detecting and recognizing an open region with sonar (clearance sonar 33) or the like when a parking target position has been passed.

(c) Setting a parking target after detecting target objects such as parking frame lines through image recognition.

These techniques will not be described in detail since they are well-known. The present embodiment is described taking the example of the case of superimposing guide lines on captured images as with the example of (2) above, and assisting driving operations for parking through manual steering by the driver. Specific control technology for executing such parking assistance (technology for calculating the positions of the guide lines in the captured images) will not be described in detail since it is well-known.

Figure 4:
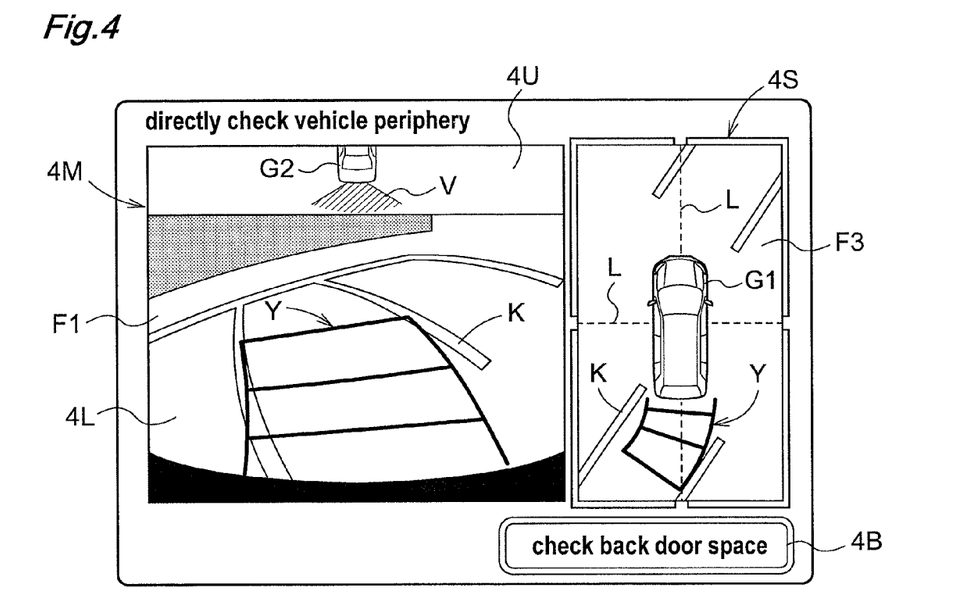
FIG. 4 is a diagram showing an example of the display of a captured image and an overhead image on a monitor device.

For example, in the example where parking assistance for garage parking is executed, images are displayed on the monitor device 4 in a layout such as that shown in FIG. 4 in the present embodiment. Specifically, the display unit 4a of the monitor device 4 is divided into a main display portion 4M and a sub display portion 4S. In the present embodiment, a captured image F1 captured by one camera 1 is displayed in the main display portion 4M, and an overhead image F3 is displayed in the sub display portion 4S. In FIG. 4, a captured image F1 showing the area rearward of the vehicle 90 that was captured by the rear camera 1a is displayed along with guide lines Y (predicted course lines) in the main display portion 4M.

The screen of the main display portion 4M is furthermore divided, and the captured image F1 is displayed in a relatively large-screen lower region 4L of the main display portion 4M. A camera icon G2 showing the camera 1 that captured the captured image F1 displayed in the lower region 4L is displayed in a relatively small-screen upper region 4U. The camera icon G2 is displayed as a graphic image (illustration image) that illustratively show a field of view V and the position where the camera 1 is mounted on the vehicle 90. In the present embodiment, the captured image F1 captured by the rear camera 1a is displayed in the lower region 4L, and the camera icon G2, which is a design of the rear portion of the vehicle 90 and the illustrative field of view V of the rear camera 1a, is displayed in the upper region 4U. Note that the field of view V indicated by the camera icon G2 does not necessarily need to match the actual field of view of the camera 1. The field of view V is set with focus on intelligibility and aesthetic design.

The sub display portion 4S displaying the one overhead image F3 is divided into multiple divided regions. In the present embodiment, the sub display portion 4S is sectioned into four regions by two boundary lines L that divide the sides of the sub display portion 4S into two portions and are orthogonal each other. Also, a vehicle image G1 showing the vehicle 90 from above is displayed at the position where the two boundary lines L intersect (the central portion in the overhead image F3 in FIG. 4). This vehicle image G1 includes the previously described exterior image (graphic image) of the roof of the vehicle 90, and may be an illustration image that illustratively or photo-realistically expresses the exterior of the vehicle 90 similarly to the exterior image (graphic image), or may be a photograph image or video image obtained by actually capturing (capturing and storing in advance) images of the exterior of the vehicle 90. In the case of a concerning event such as when the driver finds an object that will be an obstacle in any of the sectioned regions, that region can be displayed enlarged to the full size of the sub display portion 4S by touching that region, for example. Also, a configuration is possible in which at that time, an object such as one that would be determined to be an obstacle is detected by the clearance sonar 33 or through image recognition, and is displayed in an emphasized manner in the enlarged display in the sub display portion 4S. In other words, the drive assist device 10 is also provided with a periphery monitoring function, and the sub display portion 4S serves as the main display unit of the drive assist device 10 that functions as the periphery monitoring device.

Although FIG. 4 shows the example of the case where the captured image F1 from the rear camera 1a is displayed, a captured image F1 from another camera 1 may of course also be displayed. A configuration is possible in which it is possible to use a touch button (not shown) provided on the touch panel 4b to select the captured image F1 of which camera 1 is to be displayed, and a configuration is possible in which a separate selection button is provided in the vehicle 90. Also, both a touch button and a selection button may be used. Furthermore, the switching between the captured image F1 from the rear camera 1a to that from another camera 1 such as the front camera 1d, for example, may be performed automatically based on a detection result from the shift lever switch 25. In other words, the captured image F1 from the rear camera 1a may be automatically displayed when the shift lever has been set to the reverse position.

It is assumed in the present embodiment that a navigation screen such as a map of the navigation system is constantly displayed on the monitor device 4 when the shift lever is at a position other than the reverse position. Then the captured image F1 from the front camera 1d, the left-side camera 1b, or the right-side camera 1c is displayed when an operation is performed on the touch button, the selection button, or the like. Note that the captured image F1 from the rear camera 1a may also be able to be selected here. On the other hand, it is assumed that when the shift lever is set to the reverse position, the display is automatically switched from the navigation screen or the captured image F1 from the camera 1b, 1c, or 1d to the captured image F1 from the rear camera 1a. Regardless of the position of the shift lever, the overhead image F3 is displayed in the sub display portion 4S when the captured image F1 from any of the cameras 1 is displayed. The guide lines Y including the predicted course lines are displayed on the captured image F1 (main display portion 4M) and the overhead image F3 (sub display portion 4S) only when the shift lever is at the reverse position and the captured image F1 from the rear camera 1a is displayed in the main display portion 4M. The following describes an embodiment of the drive assist device 10 according to the present invention taking the example of the case where the shift lever is set to the reverse position.

Figure 5:
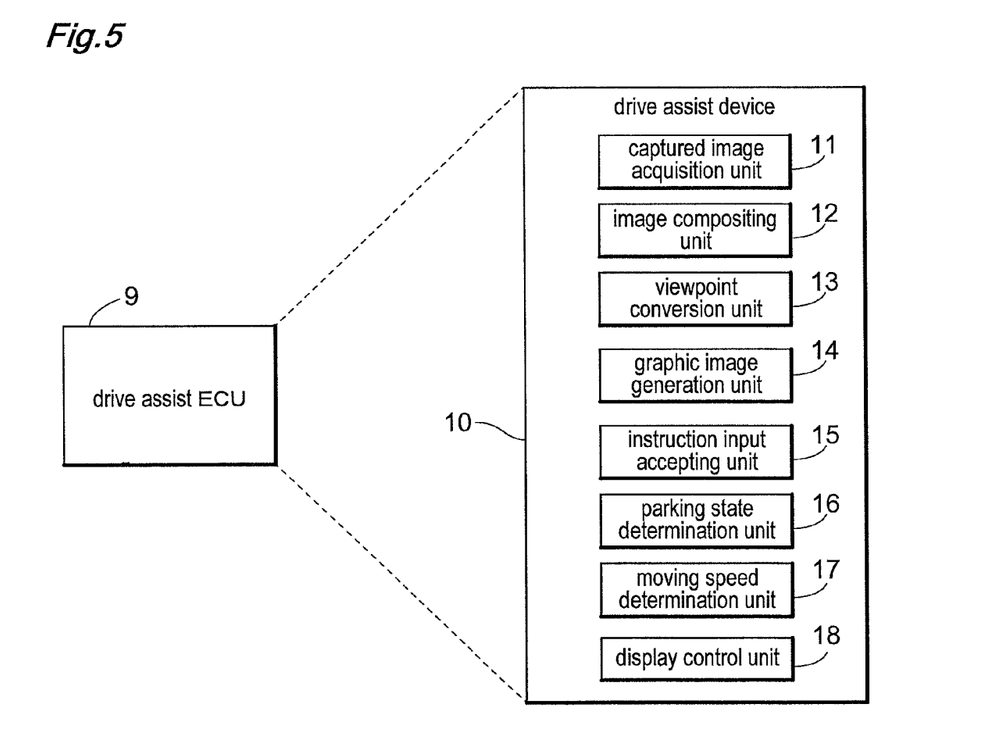
FIG. 5 is a block diagram schematically showing an example of a functional configuration of a drive assist device.

As shown in the example in FIG. 5, the drive assist device 10 of the present embodiment is configured including the following function units: a captured image acquisition unit 11, an image compositing unit 12, a viewpoint conversion unit 13, a graphic image generation unit 14, an instruction input accepting unit 15, a parking state determination unit 16, a moving speed determination unit 17, and a display control unit 18. As described above, the drive assist device 10 is configured as the drive assist ECU 9 along with the CPU 5, the memories, and the other peripheral circuits. The CPU 5 realizes the function units of the drive assist device 10 by executing various types of arithmetic processing using parameters and programs that are stored in the program memory 6. In other words, the function units of the drive assist device 10 are realized by cooperation between hardware and software.

The captured image acquisition unit 11 is a function unit that acquires captured images obtained by the cameras 1 capturing images of scenes in the periphery of the vehicle 90. In the present embodiment, the vehicle 90 is provided with four cameras 1, and therefore the captured image acquisition unit 11 acquires four types of captured images that have been captured by the four cameras 1. In the case where the vehicle 90 is provided with only one camera 1, such as the case of providing only the camera 1 (rear camera 1a) that captures images of a scene in the periphery of the vehicle 90 that includes at least the area rearward of the vehicle 90, the captured image from the rear camera 1a is acquired.

The image compositing unit 12 is a function unit that obtains one composite image by compositing multiple types (four types) of captured images that are captured by multiple cameras 1 (four cameras 1 in the present embodiment) and each include a common portion (reference sign W in FIG. 2) with at least one other type of captured image. The viewpoint conversion unit 13 is a function unit that performs viewpoint conversion on a composite image so as to generate an overhead image showing the vehicle 90 from above. In the case where the vehicle 90 is provided with only one camera 1, no composite image exists, or the composite image is the same image as the captured image. In this case, the viewpoint conversion unit 13 performs viewpoint conversion on the one captured image so as to generate an overhead image showing the vehicle 90 from above. Note that a composite image in which multiple captured images are composited is also a captured image in a broad sense, and therefore the viewpoint conversion unit 13 can also be said to be a function unit that performs viewpoint conversion on one or a plurality of captured images so as to generate an overhead image showing the vehicle 90 from above. It should also be noted that of course a configuration is possible in which the viewpoint conversion unit 13 performs viewpoint conversion on each captured image so as to generate individual overhead images, and the image compositing unit 12 composites the individual overhead images together so as to generate a composite overhead image. Since the individual overhead images also contain common portions that correspond to reference sign W in FIG. 2, the image compositing unit 12 may generate a composite overhead image using the common portions.

The graphic image generation unit 14 is a function unit that generates a graphic image expressing the back door 91 as seen from the same viewpoint as that in the overhead image when the back door 91 is in the open state. This graphic image is generated as an image expressing the shape (outer shape) of the back door 91. For example, the graphic image is an exterior image of the back door 91. The exterior image may be a photograph image or video image obtained by actually capturing images of the exterior of the back door 91, or an illustration image (design image) that illustratively expresses the exterior of the back door 91 with a line drawing or the like, such that an image of the back door 91 actually being open is evoked. Of course, even in the case of an illustration image, the back door 91 may be expressed photo-realistically. Also, the illustration image is not limited to being an exterior image, and may be an image that shows a silhouette or contour lines of the outer edge portion of the back door 91.

In other words, the graphic image may in principle be any type of image as long as it is a mode that enables favorably showing the range occupied by the back door 91 in the overhead image. There are cases where the graphic image that is superimposed on the overhead image shows the roof of the vehicle 90 as described above. As one mode, a graphic image in which the roof of the vehicle 90 and the back door 91 are expressed with the same type of image facilitates understanding of the association between them, and is aesthetically pleasing, and thus is preferable. Note that although the fact that the vehicle 90 exists and its position are realities expressed in the overhead image, the fact that the back door 91 is in the open state is not a reality in most cases. This is because it is thought to be extremely rare to drive for the purpose of parking while the back door 91 is in the open state. Accordingly, as another mode, a graphic image is possible in which the roof of the vehicle 90 and the back door 91 are expressed by different types of images. For example, the roof of the vehicle 90, which is in a realistic state, is expressed by a photograph image, and the back door 91, which is in a virtual state, is an illustration image. This is effective in the case of demand for distinguishing between a realistic state and a virtual state.

Furthermore, the graphic image may be generated as a transparent image or a semi-transparent image regardless of whether it is a photograph image, a video image, or an illustration image (including an exterior image, contour lines, a silhouette, and the like). Specifically, if the graphic image is at least semi-transparent, in the case where an obstacle or the like is present on the road surface, that obstacle or the like will not be hidden in the shadow of the graphic image showing the back door 91. This enables checking space for opening the back door 91 while maintaining intelligibility, and therefore the periphery monitoring function is also favorably maintained. Note that in the case where the graphic images of the roof of the vehicle 90 and the back door 91 are displayed using different expression methods, a configuration is possible in which the roof of the vehicle 90 and the back door 91 are expressed by the same type of image, and the display mode of the images is set differently between non-transparent and transparent (including semi-transparent).

In the case where the graphic image is expressed by a photograph image, a video image, an illustration image (an exterior image or a silhouette), or the like, the graphic image may be made transparent or semi-transparent while leaving contour lines that indicate the outermost edges. Also, the graphic image may always be transparent or semi-transparent, or the display mode may be changed depending on whether an object such as an obstacle is present. For example, a configuration is possible in which a non-transparent graphic image is normally displayed, and the graphic image is changed to transparent or semi-transparent if an object that will be an obstacle is detected by a sensor such as the clearance sonar 33. Also, there is no limitation to detection by a sensor such as the clearance sonar 33, and a configuration is possible in which a difference from an even road surface is recognized by an image recognition unit (not shown) or through graphic processing performed by the graphic image generation unit 14, and the graphic image is set to transparent or semi-transparent. In other words, the transparency of the graphic image may be changed according to the uniformity (contrast) of the overhead image at the position where the graphic image is superimposed. Note that of course there is no need for the transparency to be constant, and the transparency may vary according to the object detection probability, the uniformity of the road surface, the hue, or the like. Also, in the case where the display mode is changed depending on whether an object such as an obstacle is present, there is no limitation to transparency and semi-transparency, and the driver's attention may be evoked by blinking the graphic image.

The display control unit 18 is a function unit that displays the overhead image on the monitor device 4 in the vehicle compartment with the graphic image superimposed thereon. As will be described later, the display control unit 18 determines whether a display condition is satisfied based on a result of processing performed by the instruction input accepting unit 15, the parking state determination unit 16, the moving speed determination unit 17, or the like, and displays the overhead image on the monitor device 4 in the vehicle compartment with the graphic image superimposed thereon if the display condition is satisfied. Specifically, the display control unit 18 superimposes a graphic image G3 such that the back door 91 is open from a vehicle image G1, which is an exterior image (graphic image) showing the vehicle 90 from the same viewpoint as that of the overhead image. This enables the driver to easily visualize the state in which the back door 91 is open.

The instruction input accepting unit 15 is a function unit that accepts an input instruction in the case where a passenger of the vehicle 90 such as the driver has performed an operation on an instruction input unit for instructing the superimposition of the graphic image on the overhead image. Based on an input instruction accepted by the instruction input accepting unit 15, the display control unit 18 determines whether the display condition is satisfied, and superimposes the graphic image on the overhead image if the display condition is satisfied.

The parking state determination unit 16 is a function unit that makes a determination regarding the parking state, which indicates the state of progress when the vehicle 90 is parked. For example, the parking state determination unit 16 uses well-known odometry technology or the like to calculate the parking progress, such as the trajectory of the vehicle 90 during parking, based on a steering angle acquired from the steering sensor 21, a speed acquired from the wheel speed sensor 23, and the like, and determines that the parking state is the final phase of parking if the vehicle 90 is in a straight forward/backward state. The display control unit 18 can determine whether the display condition is satisfied based on the result of the parking state determination made by the parking state determination unit 16, and superimpose the graphic image on the overhead image if the display condition is satisfied.

Figure 6:
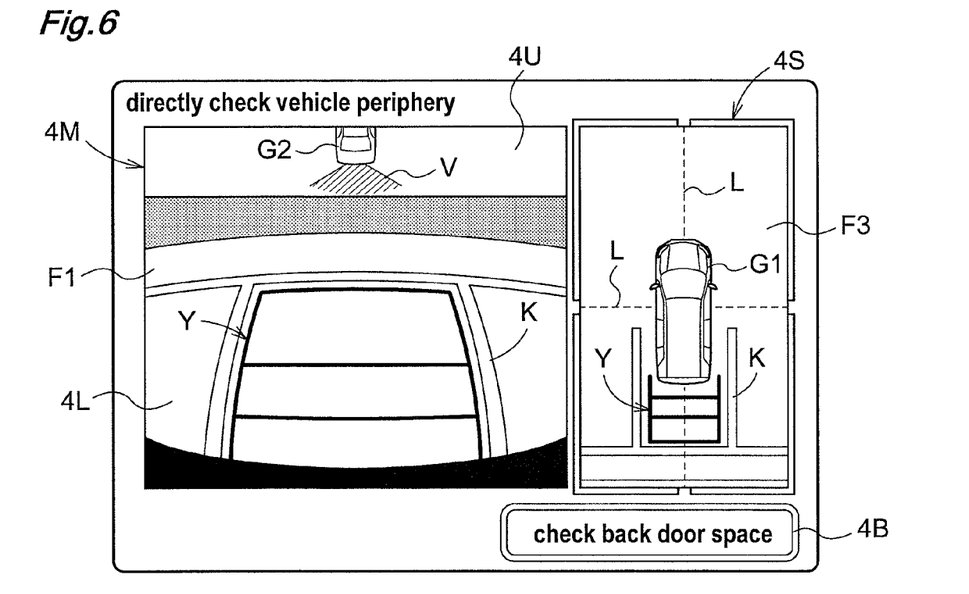
FIG. 6 is a diagram showing an example of a captured image and an overhead image before the superimposition of an overhead image.

Also, in the case where the vehicle 90 is provided with side cameras 1b and 1c as in the present embodiment, and the vehicle 90 is to be parked in a parking zone depicted by zone lines K, images of the zone lines K can be captured by the two side cameras 1b and 1c. The degree to which the vehicle 90 is parallel to the parking zone can then be calculated by the parking state determination unit 16 performing image recognition on the zone lines K based on the captured images from the two side cameras 1b and 1c. For example, compared to FIG. 4 showing the initial phase of parking, in FIG. 6 showing the final phase of parking, the angle formed by the zone lines K and the vehicle 90 is smaller, and a substantially parallel state is achieved. In other words, in the case of parking in a parking zone that has the zone lines K, it is possible to obtain the degree of parallelism between the vehicle 90 and the zone lines K, and make a determination regarding the parking state based on the degree of parallelism. The parking state determination unit 16 can then determine that the parking state is the final phase of parking if the degree to which the vehicle 90 is parallel to the parking zone is in a predetermined range. More specifically, it is possible to determine that the parking state is the final phase of parking if the degree of parallelism between the zone lines K and the vehicle 90 is higher than a predetermined threshold value (if the angle formed by the zone lines K and the vehicle 90 is lower than a predetermined threshold value). Although the angle formed by the zone lines K and the vehicle 90 can be calculated by image processing using the captured image from the rear camera 1*a*, the closer the parking state is to the final phase of parking, the shorter the zone lines K become in the captured image, and thus there is the possibility of a reduction in calculation precision. In the case where the side cameras 1*b* and 1*c* are provided as in the above embodiment, more precise calculation can be performed when captured images from these side cameras are also used.

The moving speed determination unit 17 determines whether the moving speed of the vehicle 90 is less than or equal to a predetermined upper limit speed based on a detection result from the wheel speed sensor 23. Since the moving speed of the vehicle 90 decreases when parking is completed, there is a low possibility of the parking state being in the final phase of parking driving if the moving speed is faster than the upper limit speed, and therefore it is preferable to give the periphery monitoring function the highest priority possible. On the other hand, there is also little need to superimpose the graphic image on the overhead image if the moving speed is faster than the upper limit speed since there is little need to check space in which the back door 91 can be opened. For example, the display control unit 18 can determine that the display condition is satisfied if the moving speed of the vehicle 90 is less than or equal to the predetermined upper limit speed based on the determination result from the moving speed determination unit 17, and superimpose the graphic image on the overhead image.

Figure 7:
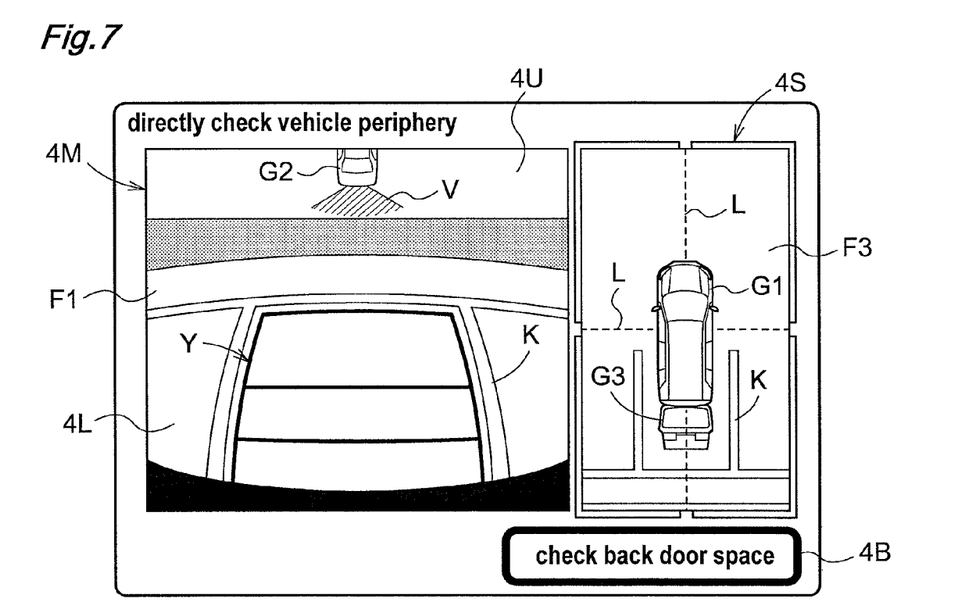
FIG. 7 is a diagram showing an example of a captured image and an overhead image after the superimposition of an overhead image.

The following describes a specific example of superimposing the graphic image G3 on the overhead image F3 with reference to FIGS. 6 and 7. FIG. 6 shows an example of the display of the monitor device 4 in the state where the vehicle 90 continues to move in reverse from the state shown in FIG. 4, and is heading into the final phase of parking. Here, the driver checks space for opening the back door 91 in order to complete the parking in a state in which the back door 91 can be opened. Specifically, the driver touches a touch button 4B ("Check back door space") arranged below the sub display portion 4S on the touch panel 4*b*. An operation performed by the driver on the touch button 4B (instruction input unit) is transmitted to the instruction input accepting unit 15. The instruction input accepting unit 15 determines that the operation performed on the touch button 4B is an operation instructing the superimposition of the graphic image G3 on the overhead image F3, and requests the display control unit 18 to superimpose the graphic image. The display control unit 18 determines that the display condition is satisfied by this request. Based on this determination result, the display control unit 18 then superimposes the graphic image G3 on the overhead image F3 as shown in FIG. 7. Accordingly, the driver can favorably check space for opening the back door 91 and complete the parking in the state in which the back door 91 can be opened.

The present invention is not limited to a configuration such as that given as an example in the description of the above embodiment, and various modifications can be made without departing from the gist of the present invention. The following describes several examples of such modifications.

(1) In the above embodiment, an overhead image including the entire periphery of the vehicle 90 is generated by compositing together captured images from four cameras 1, and the graphic image G3 showing the back door 91 is superimposed on that overhead image. However, since the space for allowing opening of the back door 91 is behind the vehicle 90, the overhead image may be generated using an image from only the rear camera 1*a*. In other words, a configuration is possible in which an overhead image showing the vehicle 90 from above is generated by performing viewpoint conversion on a captured image obtained by a vehicle-mounted camera capturing an image of the scene in the periphery of the vehicle 90 including at least the area rearward of the vehicle 90, and the graphic image G3 is superimposed on that overhead image. Note that of course a configuration is possible in which an overhead image that includes the periphery behind the vehicle 90 is generated using captured images from the rear camera 1*a*, the left-side camera 1*b*, and the right-side camera 1*c*, and the graphic image G3 is superimposed on that overhead image.

(2) The graphic image G3 may be generated as an image in which the back door 91 in the open state has a greater range than the actual size in the overhead image, regardless of differences such as the display mode or the image type, such as being a photograph image, an illustration image, transparent, or semi-transparent. Of course the graphic image may be generated as an image in which not only the back door 91 but also the vehicle 90 has a greater range than their actual sizes in the overhead image. Displaying the graphic image G3 and the vehicle image G1 larger than their actual sizes enables the driver to drive while leaving plenty of space. Even if the driver attempts to park while leaving a minimum amount of space, a small amount of extra space will be set. This also reduces the possibility of coming into contact with another object when opening the back door 91, for example. In the case of generating graphic images in which both the back door 91 and the vehicle 90 are somewhat enlarged, it is preferable that the enlargement is performed uniformly with a scale such that the outer edge of the vehicle 90, including the outer edge of the back door 91 in the open state, is approximately 10 cm larger.

(3) The above embodiment described with reference to FIGS. 6 and 7 gives the example of the case where the graphic image G3 is superimposed due to the driver operating the touch button 4B. In other words, it is described in this example that the display control unit 18 superimposes the graphic image G3 on the overhead image when a predetermined display condition is satisfied, and the display condition is that the display control unit 18 detected an operation performed by the driver on the touch button 4B via the instruction input accepting unit 15. However, there is no limitation to this mode, and it is possible for various "display conditions" to be set with additional use of determination results from the parking state determination unit 16 and the moving speed determination unit 17 that are described above.

For example, the display control unit 18 may determine whether the display condition is satisfied according to the parking state determined by the parking state determination unit 16, as described above. Here, "parking state" refers to the state of progress when the vehicle 90 is being parked. Since the ability to open the back door 91 needs to be checked in the final phase of parking, the display control unit 18 can determine that the display condition is satisfied when the parking state is the final phase of parking. Also, the display control unit 18 may determine whether the display condition is satisfied according to the moving speed of the vehicle 90, which is determined by the moving speed determination unit 17. Since the moving speed of the vehicle 90 decreases in the final phase of parking, it can be determined that the display condition is satisfied when the moving speed of the vehicle 90 is less than or equal to a predetermined set speed. Note that a configuration is possible in which the parking state determination unit 16 determines the parking state based on the moving speed of the vehicle 90, which is determined by the moving speed determination unit 17. Specifically, the parking state determination unit 16 may determine that the parking state is the final phase of parking when the moving speed determination unit 17 has determined that the moving speed of the vehicle 90 is less than or equal to the predetermined set speed.

A configuration is possible in which regardless of whether a passenger such as the driver has input an instruction, the display control unit 18 determines that the display condition is satisfied and automatically superimposes the graphic image G3 when the parking state is the final phase of parking or the moving speed of the vehicle 90 is less than or equal to the predetermined set speed based on a determination result from the parking state determination unit 16 or the moving speed determination unit 17. Alternatively, the display control unit 18 may display the touch button 4B upon determining that a first display condition is satisfied when the parking state is the final phase of parking or the moving speed of the vehicle 90 is less than or equal to the predetermined set speed, and then display the graphic image G3 upon determining that a second display condition is satisfied by an operation performed by a passenger on the touch button 4B. For example, a configuration is possible in which the touch button 4B is not displayed in FIG. 4 since the parking state is the initial phase of parking, and the touch button 4B is displayed in the final phase of parking as shown in FIG. 6.

(4) Although specific examples of when the display condition is satisfied are described above, a configuration is possible in which a condition (display prohibition condition) is set for prohibiting superimposition display even if the various display conditions are satisfied. The display control unit 18 determines that a display condition is satisfied in accordance with the satisfaction of another condition, only if the display prohibition condition is not satisfied. For example, as described above, the display control unit 18 can determine that the display condition is satisfied if the moving speed of the vehicle 90 is less than or equal to a predetermined upper limit speed (e.g., approximately 6 km/h) based on a determination result from the moving speed determination unit 17. In other words, it can be said that "the display prohibition condition is satisfied" while the moving speed of the vehicle 90 exceeds the predetermined upper limit speed. If the display prohibition condition is satisfied, the display control unit 18 does not determine that the display condition is satisfied even if the touch panel 4b is touched, or it is determined that the vehicle 90 is parallel to the zone lines K and the parking state is the final phase of parking. It is more preferable for the driver to check directly visually or based on an actual captured image than by referencing the graphic image G3. Accordingly, it is preferable that the display control unit 18 does not determine that the display condition is satisfied while the moving speed of the vehicle 90 exceeds the predetermined upper limit speed, and determines that the display condition is satisfied only if the moving speed is less than or equal to the predetermined upper limit speed.

(5) The instruction input unit by which the driver or another passenger instructs the display of the graphic image G3 is not limited to the touch button 4B. The instruction input unit may be a speech recognition device or mechanical switch provided in the vehicle compartment.

(6) In the example described above, the graphic image G3 showing the back door 91 is superimposed on the overhead image when parking is accompanied by movement in reverse. However, unlike the captured image displayed in the main display portion 4M, the overhead image displayed in the sub display portion 4S displays the scene in all directions around the vehicle 90 even during forward movement, and therefore the graphic image G3 may be superimposed on the overhead image due to an instruction on the touch button 4B even in the case of forward movement.

(7) It is described above that the overhead image F3 is a captured image showing the vehicle 90 from above. For example, it is preferable that the overhead image F3 is an image looking down on the vehicle 90 from above the vehicle 90 in the vertical direction. In this case, the state in which the back door 91 is fully opened can be visually recognized at a glance. Accordingly, the driver can more favorably check space for opening the back door 91 along with the image of the periphery of the vehicle 90.

As described above, the present invention enables a driver to favorably check space for opening the back door along with an image of the periphery of a vehicle.

INDUSTRIAL APPLICABILITY

The present invention is applicable to a drive assist device for a vehicle that has a flip-up back door in a rear portion.

REFERENCE SIGNS LIST

1 Camera (vehicle-mounted camera)
1a Rear camera (vehicle-mounted camera)
1b Left-side camera (vehicle-mounted camera)
1c Right-side camera (vehicle-mounted camera)
1d Front camera (vehicle-mounted camera)
4 Monitor device
4B Touch button (instruction input unit)
10 Drive assist device
11 Captured image acquisition unit
13 Viewpoint conversion unit
16 Parking state determination unit
18 Display control unit
90 Vehicle
91 Back door
F1 Captured image
F3 Overhead image
G3 Graphic image

The invention claimed is:

1. A drive assist device for a vehicle that has a flip-up back door in a rear portion, the drive assist device comprising:
   a captured image acquisition unit that acquires a captured image obtained by a vehicle-mounted camera capturing an image of a scene in a periphery of the vehicle that includes at least an area rearward of the vehicle;
   a viewpoint conversion unit that converts the captured image into an overhead image showing the vehicle from above;
   a graphic image generation unit that generates a graphic image expressing the shape of the back door, in which the back door is shown in an open state from the same viewpoint as that of the overhead image; and
   a display control unit that displays the overhead image on a monitor device in a vehicle compartment with the graphic image superimposed thereon; and a parking state determination unit that makes a determination regarding a parking state that indicates a state of progress when the vehicle is parked, wherein the display control unit determines whether a display condition is satisfied in accordance with the parking state, wherein the display control unit superimposes the graphic image such that the back door is open from a vehicle image that shows the vehicle from the same viewpoint as that of the overhead image, wherein the display control unit superimposes the graphic image on the overhead image in a case where the predetermined display condition is satisfied when the parking state corresponds to a final phase of parking based on a moving speed of the vehicle, wherein the parking state determination unit determines that the parking state is the final phase of parking when the moving speed is less than or equal to a predetermined speed.

2. The drive assist device according to claim 1, wherein the graphic image is an exterior image of the back door.

3. The drive assist device according to claim 1, wherein the graphic image is a contour line of the back door.

4. The drive assist device according to claim 1, wherein the graphic image is semi-transparent.

5. The drive assist device according to claim 1, wherein the graphic image is generated as an image in which the back door in the open state has a greater range than in the overhead image.

6. The drive assist device according to claim 1, wherein the display control unit determines that the display condition is satisfied in a case where a passenger of the vehicle performed an operation on an instruction input unit that instructs superimposition of the graphic image on the overhead image.

7. The drive assist device according to claim 1, comprising a parking state determination unit that makes a determination regarding a parking state that indicates a state of progress when the vehicle is parked, wherein the display control unit determines whether the display condition is satisfied in accordance with the parking state.

8. The drive assist device according to claim 1, wherein the display control unit determines that the display condition is satisfied in a case where a moving speed of the vehicle is less than or equal to a predetermined upper limit speed.

9. The drive assist device according to claim 8, wherein the display control unit does not determine that the display condition is satisfied when the moving speed of the vehicle exceeds the predetermined upper limit speed, and determines that the display condition is satisfied only when the moving speed is less than or equal to the predetermined upper limit speed.

10. The drive assist device according to claim 1, wherein the overhead image is an image looking down from above the vehicle in a vertical direction.

11. A drive assist device for a vehicle that has a flip-up back door in a rear portion, the drive assist device comprising:

a captured image acquisition unit that acquires a captured image obtained by a vehicle-mounted camera capturing an image of a scene in a periphery of the vehicle that includes at least an area rearward of the vehicle;

a viewpoint conversion unit that converts the captured image into an overhead image showing the vehicle from above;

a graphic image generation unit that generates a graphic image expressing the shape of the back door, in which the back door is shown in an open state from the same viewpoint as that of the overhead image; and a display control unit that displays the overhead image on a monitor device in a vehicle compartment with the graphic image superimposed thereon; and a parking state determination unit that makes a determination regarding a parking state that indicates a state of progress when the vehicle is parked, wherein the display control unit determines whether a display condition is satisfied in accordance with the parking state, wherein the display control unit superimposes the graphic image such that the back door is open from a vehicle image that shows the vehicle from the same viewpoint as that of the overhead image, wherein the display control unit superimposes the graphic image on the overhead image in a case where the predetermined display condition is satisfied when the parking state corresponds to a final phase of parking based on a trajectory of the vehicle, wherein the parking state determination unit determines that the parking state is the final phase of parking when the vehicle is in a straight forward/backward state based on a trajectory of the vehicle.

* * * * *